United States Patent [19]

Doherty et al.

[11] Patent Number: 4,866,241

[45] Date of Patent: Sep. 12, 1989

[54] PLASMA SPRAY APPARATUS FOR COATING IRREGULAR INTERNAL SURFACES

[75] Inventors: William G. Doherty, Lebanon; Mark McCoy; David J. Sharp, both of Indianapolis, all of Ind.

[73] Assignee: Union Carbide Corporation, Danbury, Conn.

[21] Appl. No.: 175,240

[22] Filed: Mar. 30, 1988

[51] Int. Cl.[4] .............................................. B23K 9/00

[52] U.S. Cl. .......................... 219/121.47; 219/121.48; 219/76.16; 427/233; 427/236

[58] Field of Search ...................... 219/121.47, 121.54, 219/121.59, 121.56, 121.48, 76.16, 75, 74; 427/34, 233, 236, 230, 321; 118/8

[56] References Cited

U.S. PATENT DOCUMENTS

| | | | |
|---|---|---|---|
| 3,911,175 | 10/1975 | Chemeris et al. | 219/121.47 |
| 3,915,114 | 10/1975 | Pelton | 118/8 |
| 4,514,443 | 4/1985 | Kostecki | 427/230 |
| 4,667,081 | 5/1987 | Turin et al. | 219/121.79 |

FOREIGN PATENT DOCUMENTS

| | | | |
|---|---|---|---|
| 0003971 | 1/1985 | Japan | 219/121.54 |

*Primary Examiner*—M. H. Paschall
*Attorney, Agent, or Firm*—E. Lieberstein

[57] ABSTRACT

An apparatus for coating the internal surface of a tubular object having an irregular internal surface which comprises a combination of arms which enable the torch to be in the optimal coating position as it moves over and coats the internal surface.

27 Claims, 7 Drawing Sheets

PLASMA SPRAY APPARATUS FOR COATING IRREGULAR INTERNAL SURFACES

FIELD OF THE INVENTION

The present invention relates to plasma coating of internal surfaces of tubular objects.

BACKGROUND OF THE INVENTION

In plasma coating technology, coatings are applied by injecting a powder into a plasma stream and impinging the stream upon a surface of an object to be coated. In order to coat the entire surface, the point at which the stream impinges upon the surface or the impingement point, is moved over the surface, by moving the torch body and/or the object. In order to achieve an optimal coating, the angle of the axis of the plasma stream to the substrate surface at the moving impingement point should be maintained perpendicular. In addition, the standoff, the distance between the nozzle of the torch and the impingement point should be maintained substantially constant as the impingement point moves over the surface. An additional requirement for an optimal coating is that the impingement point move across the surface at a substantially constant rate.

For simple surfaces of revolution, such as cylinders, conical sections, and annular surfaces, these requirements are met by merely rotating the object and moving the torch at a constant rate along a straight line.

For more complex shapes, achieving these requirements is more difficult. To coat, for example, a surface of rotation, such as a spherical surface, the torch must be moved along a curved path to maintain a constant standoff, and be rotated to maintain a perpendicular impingement angle. The constant standoff, and perpendicular impingement angle can be provided by an apparatus that moves the torch in the direction parallel and the direction perpendicular to the axis of rotation of the object, and rotates the torch on an axis perpendicular to the plane defined by these directions. However, under certain circumstances, the rotation of the torch introduces variation in the rate of movement of the impingement point over the surface. For example, when the axis of rotation is through the torch body, rotation of the torch through an angle sweeps the plasma spray across the substrate at a varying speed. Unless the sweeping motion is compensated by complex motion programming of the torch, the resulting variation in speed leads to a suboptimal coating. It is possible to avoid the sweeping motion altogether by rotating the torch about the axis passing through the impingement point. Rotation about this axis generally requires movement of a bulky support and supply structure for the torch. Due to space limitations, it is often difficult or impossible to not only provide this movement, but to additionally provide for a constant standoff and perpendicular spray axis.

For tubular objects with irregular internal surfaces the requirements for achieving an optimal coating are particularly difficult to achieve. Such objects include tubular objects with essentially an internal surface of rotation with an irregular profile in the direction of the longitudinal axis, or tubular objects with an internal surface of constant profile in the direction of a longitudinal axis, but with non-circular cross-sections perpendicular to a longitudinal axis. When the internal surface of the tubular object is irregular, it is difficult or impossible to achieve these motions with a conventional apparatus. The difficulty is due in large part to the support and supply apparatus required for a plasma torch. A plasma torch is typically connected to one or more gas supply lines, a powder supply line, two large electrical cables, and two cooling water hoses. These are bound together in a bundle as a rather inflexible service connection. The service connection and the torch itself are attached to a rigid arm which is in turn attached to the mechanism for moving to torch through the desired motions. As the torch moves over the internal surface, the rigid arm, the torch, and/or the service connection generally run into the object being coated, thus preventing the desired motions of the torch. This problem is particularly severe as the length to diameter ratio of the object increases.

Confronted with the difficulties of moving the torch in a manner to achieve the optimal coating quality on internal surfaces of tubular objects, the practitioner must either avoid the coating of certain complex shapes, or be satisfied with a coating of suboptimal quality.

OBJECTS OF THE INVENTION

It is therefore an object of the invention to provide an apparatus that provides for an optimal quality coating upon irregular internal surfaces of tubular objects.

It is also an object of the invention to provide an apparatus that can coat the inside surfaces of tubular objects with a higher length to diameter ratio than was generally possible in the prior art.

It is also an object of the invention to provide an apparatus that can coat either or both ends of an open ended tubular object, in addition to coating the internal surfaces.

Further objects will become evident in the description of the invention that follows.

SUMMARY OF THE INVENTION

An embodiment of the invention is a plasma spray apparatus adapted for coating an irregular internal surface of a tubular object in which the spray apparatus has a nozzle for directing the coating material on the internal surface of the object and wherein a central spray axis drawn through the center line of said nozzle is adapted to be maintained perpendicular to the impingement point on the surface of the tubular object being coated which comprises:

(a) a plasma torch for spraying a plasma coating on the internal surface of the tubular object, the torch having a spray nozzle adapted to provide a spray to an impingement point on the internal surface of the tubular object;

(b) first arm means with an inner end and an outer end, the inner end fixedly attached to the torch, the length of the first arm means being such that the central spray axis drawn through the center line of the nozzle can be disposed perpendicular to the internal surface of the tubular object while the nozzle is maintained a fixed distance from the internal surface of the tubular object without interference with the internal surface of the tubular object as the impingement point moves over the internal surface;

(c) second arm means with an inner end and an outer end, the inner end fixedly attached to the outer end of the first arm means with the outer end adapted to be outside of the enclosed volume of the tubular object as the impingement point moves over the internal surface of the tubular object;

(d) third arm means with an inner end and an outer end, the inner end fixedly attached to the outer end of the second arm means with the outer end adapted such that the central spray axis can be disposed perpendicular to the internal surface of the tubular object while the nozzle is maintained a fixed distance from the internal surface of the tubular object without interference of the third arm means with the tubular object as the impingement point moves over the internal surface;

(e) moving and rotating means attached to the outer end of the third arm means for moving the first arm means, second arm means, and third arm means to effect movement of the spray nozzle in a direction parallel and in the direction perpendicular to the longitudinal axis of the tubular object, and for rotating the spray nozzle about a rotational axis so that the central spray axis is directed perpendicular to the impingement point on the internal surface of the tubular object; and (f) coordinating means for coordinating the movement and rotation of the spray nozzle as the object is rotated about its longitudinal axis such that the central spray axis is maintained substantially perpendicular to the internal surface, the distance between the spray nozzle and the impingement point is maintained substantially constant, and the rate at which the impingement point moves over the internal surface is maintained substantially constant.

The tubular objects to be coated by the apparatus of the invention include tube-shaped objects, i.e. hollow objects of a generally cylindrical shape, which have an irregular internal surface, particularly where the irregularity is longitudinal direction. The present apparatus is particularly suitable for the coating of the internal surface of objects with an internal surface of revolution, i.e. the internal surface has circular cross-sections perpendicular to the longitudinal axis, with a variable diameter in the direction of the longitudinal axis.

The internal surface of a tubular object is generally that surface which requires all or a portion of the torch, the plasma stream, and/or the torch support apparatus to be within the enclosed volume in order to optimally coat the surface. As, discussed above, to optimally coat the surface the standoff is maintained constant and the central spray axis is maintained perpendicular to the surface at the impingement point. Generally the internal surface includes the surface enclosed by or defining the enclosed volume of the tubular object, i.e. the surfaces from which lines can be drawn from one point upon the surface to another point upon the surface without passing through the object itself. However, the apparatus of the invention may also be used to coat end faces and portions of the surface near the end faces which are not within the enclosed volume of the tubular object, but are "internal surfaces" within the meaning of the present invention.

The first arm means is fixedly attached to the torch. As the impingement point moves over the internal surface of the object, the torch must be maintained in an optimal position, i.e. with a constant standoff, and with a central spray axis perpendicular to the surface at the impingement point. The length of the first arm means is chosen such that the arm does not interfere with the object while moving the impingement point over the internal surface to be coated and while maintaining the optimal position of the torch.

The second arm means is fixedly attached to the outer end of the first arm means such that the outer end of the second arm means stays outside of the enclosed volume of the object while the torch goes through all the positions required to coat the internal surface while maintaining the optimal position of the torch.

The third arm means is fixedly attached to the outer end of the second arm means. The outer end of the third arm means extends to a point such that the third arm means does not interfere with the object at any position achieved during the coating of the internal surface while maintaining the torch in an optimal position. For objects with simple outer surfaces of rotation around the longitudinal axis, such as for example, objects with an outer surface essentially cylindrical in shape with only minor variations in the outer diameter and with no large flanges and the like, the length of the third arm means is generally such that its outer end extends outside of the projected volume of the object. The projected volume is the volume formed by projection of the external surface of the object in a direction parallel to the longitudinal axis of the tubular object.

Means for moving and rotating the first, second, and third arms means to effect movement of the spray nozzle may be conventional plasma torch control devices, such as hydraulic, geared, lever, and servo-motor mechanisms, and the like. The moving and rotating means move the spray nozzle in a direction parallel and a direction perpendicular to the longitudinal axis of the tubular object. The rotating of the arm means is to maintain the central spray axis perpendicular to the surface at the impingement point. Generally the moving and rotating means are rather bulky. However, the combination of the first, second and third arm means provides an attachment of the torch to these means, without any of the moving and rotation devices interfering with the object as the central spray axis of the torch is moved.

The movements of the arm means result in movement of the central spray axis in a direction parallel and in a direction perpendicular to the longitudinal axis of the object within a working plane defined by these directions. For tubular objects with an internal surface which is a surface of rotation about the longitudinal axis, the working plane contains the longitudinal axis.

Coordinating means coordinate the rotational, the perpendicular, and parallel movements of the arm means and the spray nozzle. Suitable coordinating means are conventional, and include meshed gear mechanisms, cam control mechanisms, computer controlled motion programming, and interlocking lever mechanisms.

FIGS. *6a* and *6b* illustrate a prior art coating apparatus.

DESCRIPTION OF THE INVENTION

Figure 1:
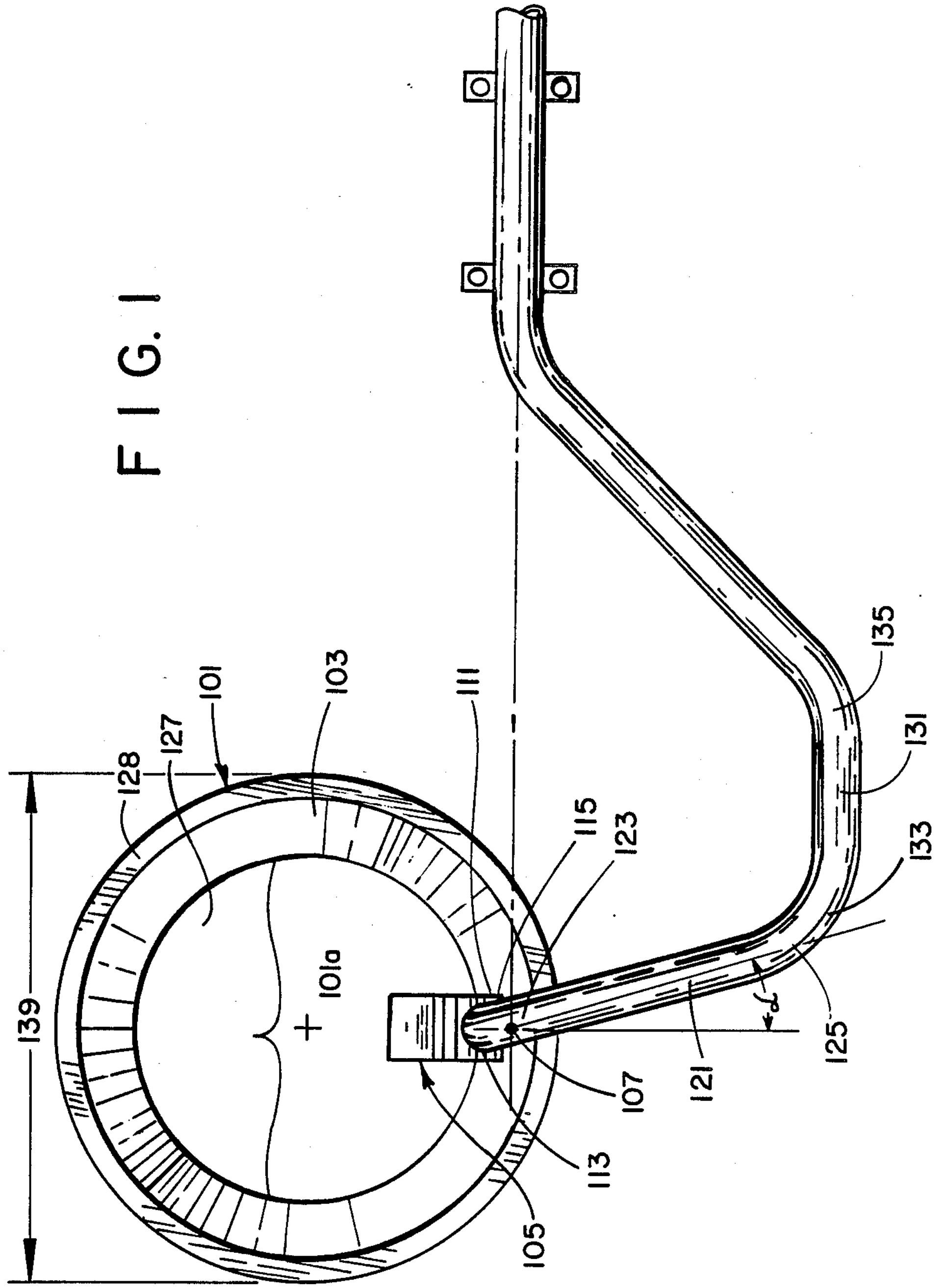
FIG. 1 is a front view of an apparatus of the invention, viewed along the longitudinal axis of the object being coated.
Figure 2:
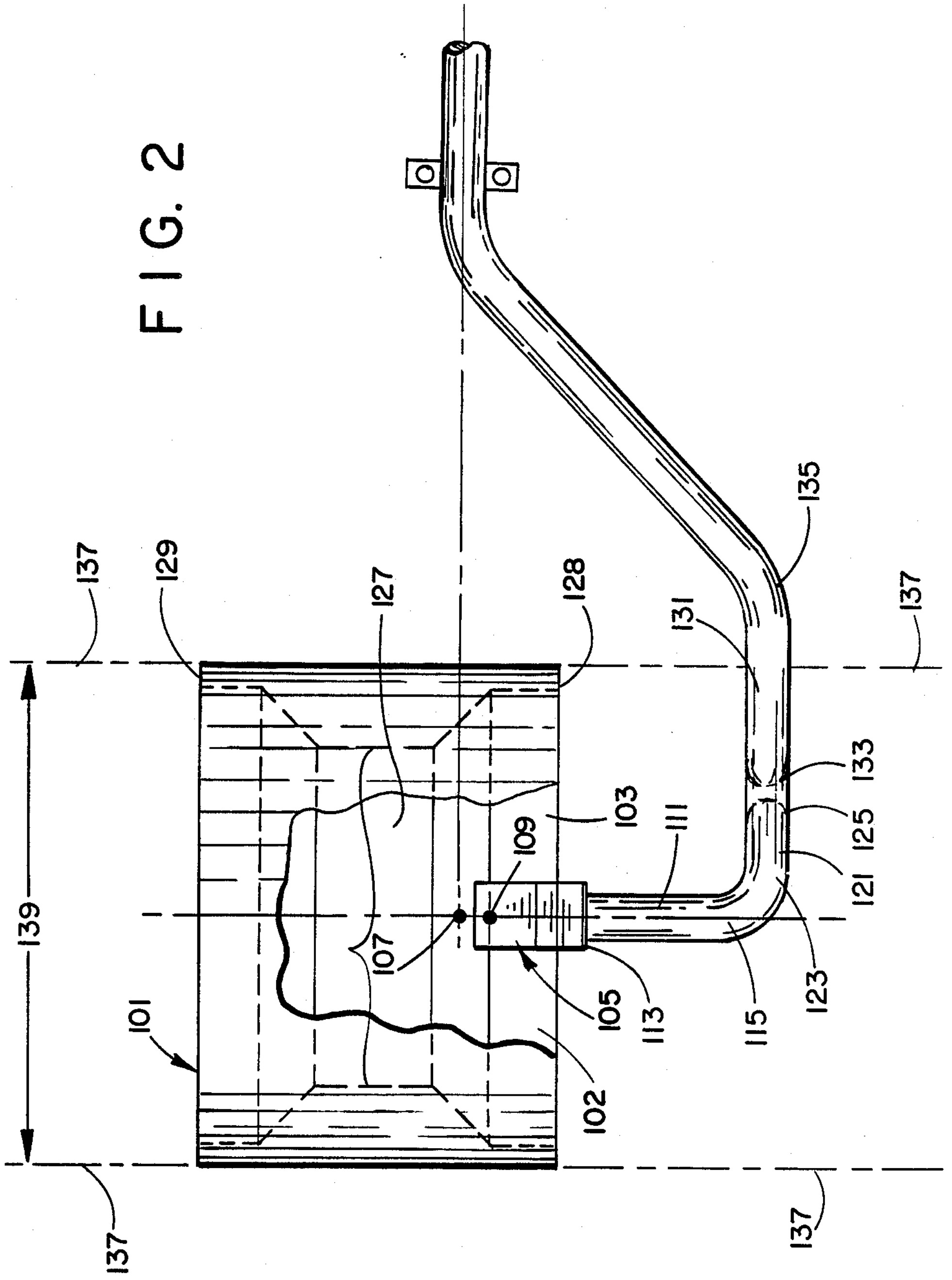
FIG. 2 is a top view of the apparatus of FIG. 1, with part of the object being coated in section.
Figure 3:
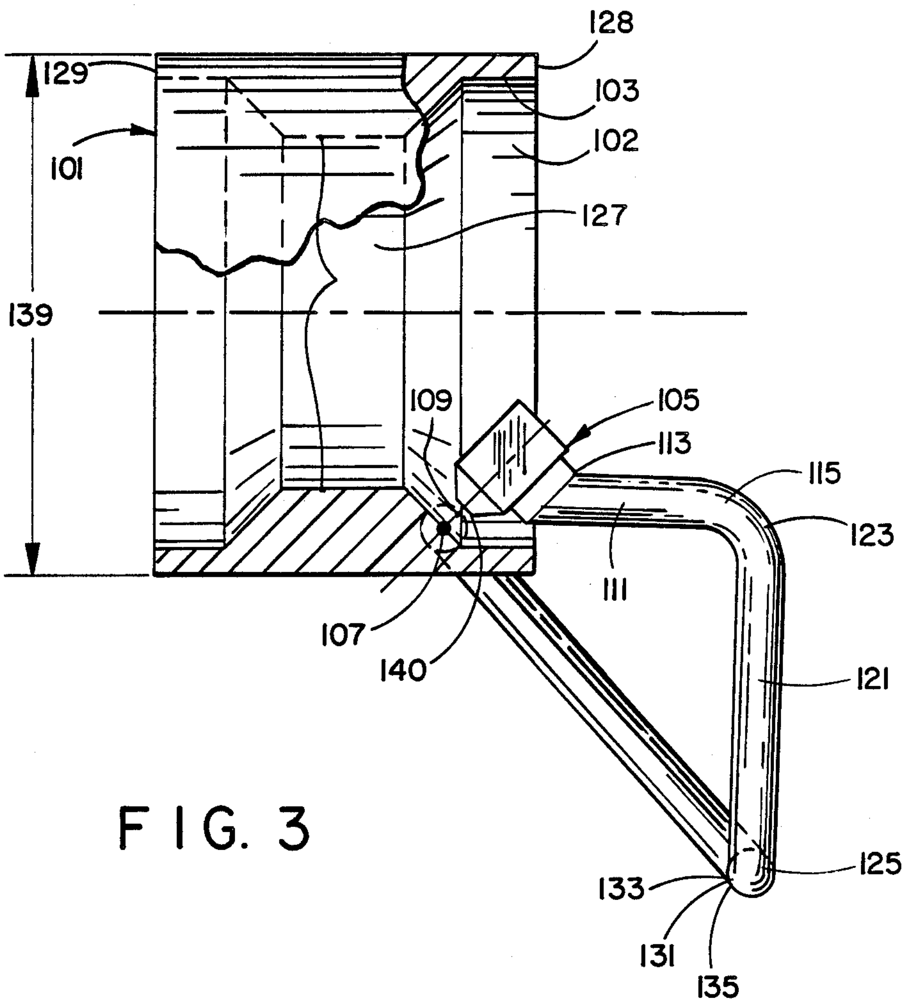
FIG. 3 is a side view of the apparatus of the invention with part of the object being coated in section, and viewed from the side opposite the means to rotate and central spray axis of the torch.

Referring to FIGS. 1 to 3, tubular object 101 to be coated has a longitudinal axis 101*a*, and has an internal surface 103. The tubular object 101 has an open end 102 for insertion of the coating apparatus.

The internal surface 103 is coated by a plasma torch 105, which directs a plasma spray (not shown) along the central spray axis 109 of the plasma torch 105 upon an impingement point 107 upon the internal surface 103. The central spray axis 109 is coincident with the axis of the spray nozzle 140 of the torch 105. As the central spray axis 109 moves, thus moving the impingement point 107 over the internal surface 103, the central spray axis 109 is maintained perpendicular to the internal surface 103, and the standoff, or the distance between the spray nozzle 140 (FIG. 3) and the impingement point 107 is maintained constant.

Figure 4A:
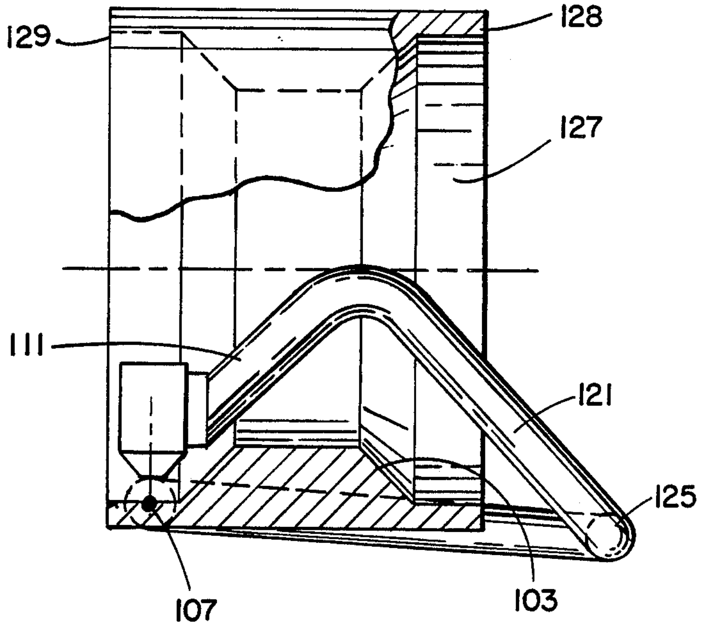
FIGS. 4*a*, 4*b*, 4*c*, and 4*d* are the same view as in FIG. 3, except the impingement point is changed to different locations upon the internal surface by changing location of the spray nozzle of the torch and rotating the spray nozzle at an appropriate angle.
Figure 4B:
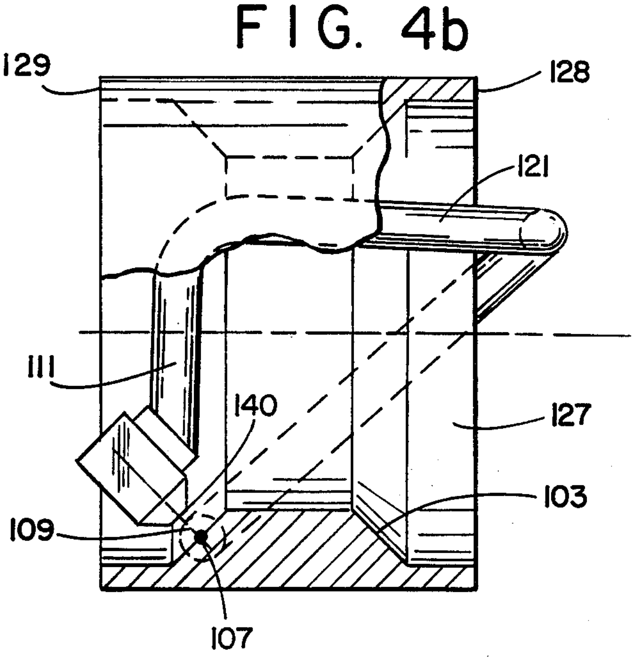
Figure 4C:
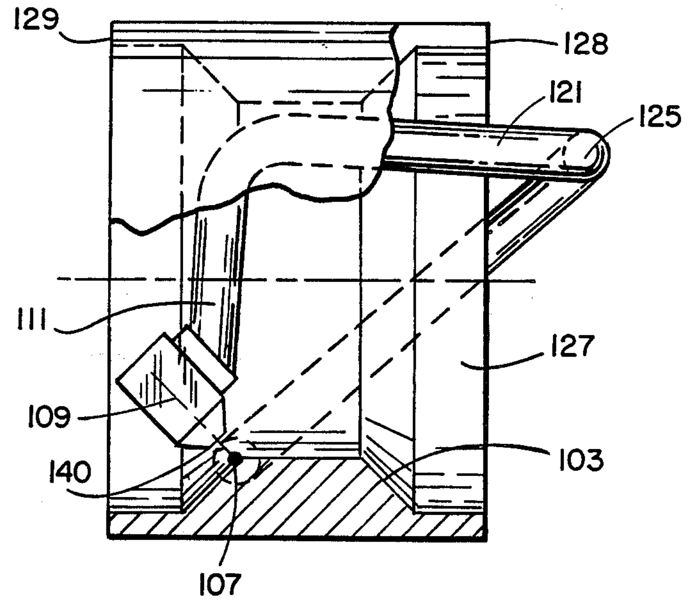
Figure 4D:
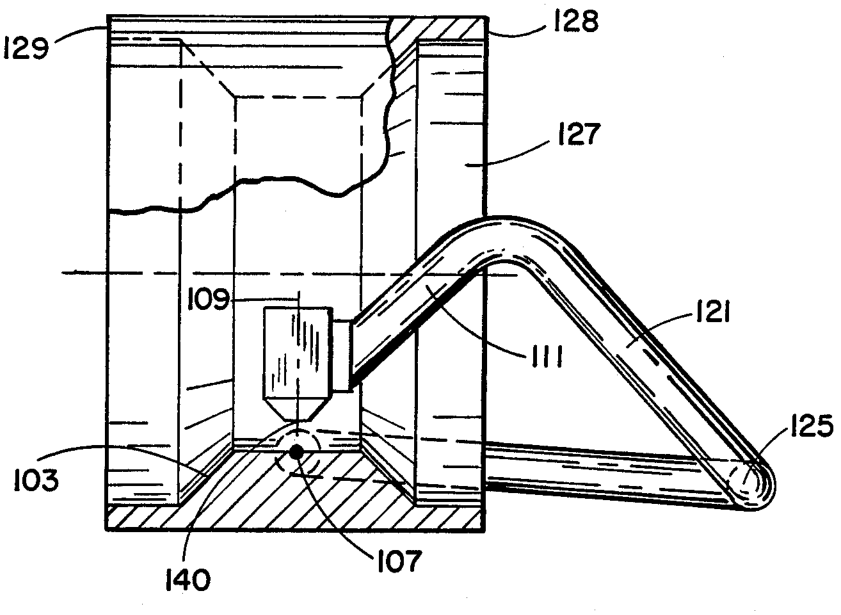

The first arm means 111 has an inner end 113 and an outer end 115, with the inner end 113 fixedly attached to the plasma torch 105. The first arm means 111 is dimensioned to clear the object being coated as the impingement point moves over the internal surface. FIGS. 4*a*, 4*b*, 4*c*, and 4*b*, show the impingement point 107 at various locations upon the internal surface 103 and with the first arm mean clearing the object 101. As illustrated particularly in FIG. 4*c*, the first arm means 111 of this embodiment is dimensioned to clear the object 101 when first arm means 111 is nearly perpendicular to the axis of rotation 101*a*, and when a portion of the internal surface 103 is being coated which is closest to the longitudinal axis 101*a*.

Referring again to FIGS. 1 to 3, the second arm means 121 has an inner end 123 and an outer end 125. The inner end 123 is fixedly attached to the outer end 115 of the first arm means 111. The placement and dimension of the second arm means 121 is such that its outer end 125 remains outside of the enclosed volume 127 of the object during movement of the torch 105 to coat the internal surface 103. Referring to FIGS. 3, and 4*a* to 4*d*, the outer end 125 of the second arm means 121 is without the enclosed volume for the illustrated locations of the central spray axis 109. In the illustrated embodiment, the enclosed volume 127 is bounded by the internal surface 103 and planes defining the end faces 128,129 of the object.

Referring again to FIGS. 1 to 3, the third arm means 131 has an inner end 133 and an outer end 135, with the inner end 133 fixedly attached to the outer end 125 of the second arm means 121. The length of the third arm means 131 is such to prevent interference with the object 101 as the internal surface 103 is coated. In a preferred embodiment, the third arm means 131 is oriented essentially parallel to the torch rotational axis 145 in order to minimize overall length of the torch 105 support apparatus. For the illustrated embodiment, the third arm means 131 is aligned such that its outer end 135 is without the projected volume 137 (FIG. 2), which here is the cylindrical volume with an infinitely long center axis corresponding to an extension of the longitudinal axis 101*a* of the tubular object 101 and a diameter equal to the largest outer diameter 139 of the tubular object 101.

It is desirable that the second arm means 121 be as short, and therefore as stiff as possible. In one embodiment of the invention, the second arm means 121 is straight and its main axis is within a first plane defined by the axis of the first arm means 111 and the central spray axis 109, and perpendicular to the main axis of the first arm means 111. Alternately, the second arm means 121 is angled from the first plane by an angle $\alpha$ (FIG. 1) such that its outer end 125 moves toward the moving and rotating means (not shown) to provide an obtuse angle between the axes of the second and third arm mean 121, 131. The angling of the second arm means 121 results in a slightly longer second arm means 121, but this results in a significantly shortening third arm means 131. The length of second arm means 121 gets longer as $1/\cos\alpha$ (which changes slowly with small angles) while third arm means 131 gets shorter as $\tan\alpha$ (which changes more quickly with small angles). This results in a shorter overall length, and a stiffer support for the torch 105. The total length would be minimized when angle $\alpha$ is such that the length of third arm means 131 approaches zero. However, the magnitude of angle $\alpha$ is limited so as to prevent second arm means 121 from interfering with the object 101 when coating deep within the object 101. Generally, the angle $\alpha$ is a function of the specific application and can be determined by conventional drafting techniques. Typical values for angle $\alpha$ are between 0° and 40°. Depending upon the magnitude of angle $\alpha$, the angle between the main axis of the third arm means 131 and the plane defined by the first and second arm means 111, 121 is typically between about 90° and 134°.

Figure 5:
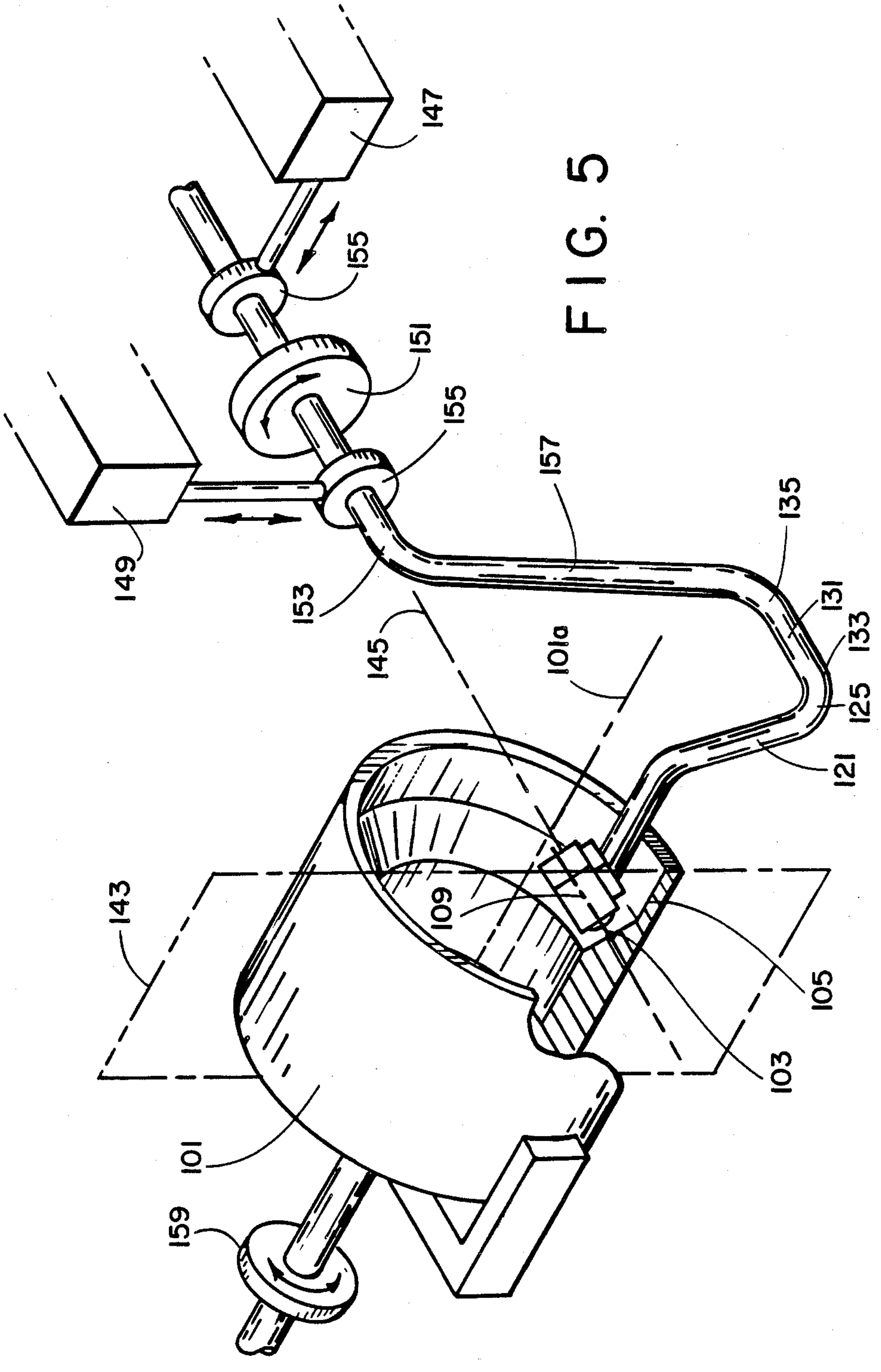
FIG. 5 is a perspective view of the apparatus as in FIG. 1.
Figure 6A:
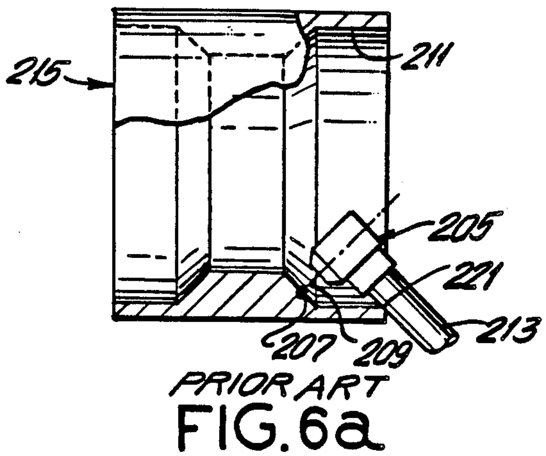
PRIOR ART FIG. 6a
Figure 6B:
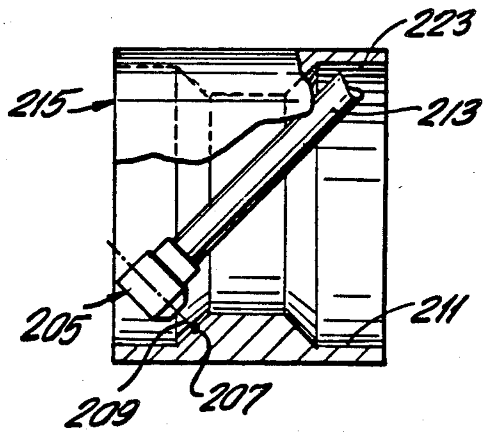
PRIOR ART FIG. 6b

Referring to FIG. 5, the positioning of the central spray axis 109 is accomplished by moving the central spray axis 109 of the torch 105 in a direction parallel and a direction perpendicular to the longitudinal axis 101*a* within a working plane 143, and rotating the central spray axis 109 of the torch 105 about a rotational axis 145 perpendicular to the working plane 143.

The movements in the working plane 143 are provided by moving means 147, 149 which move the torch central spray axis in the working plane 143 parallel and perpendicular to the longitudinal axis 101*a* , as illustrated in FIG. 5 by the arrows. The working plane 143 contains the moving central spray axis 109 and impingement point 107. For the illustrated tubular object 101, which comprises a surface of rotation about the longitudinal axis 101*a* , the longitudinal axis 101*a* is also in the working plane 143.

The moving means 147, 149 may be provided by conventional means used in plasma torch technology for the two-axis movement of a plasma torch, such as, for example, hydraulic, geared, lever, cam, and servomotor mechanisms, and the like.

The central spray axis 109 is rotated about the rotational axis 145 by rotating the torch 105 with a rotating means 151 (shown in FIG. 5 as a drive wheel). The rotating means 151 rotates the torch about the rotational axis 145 as shown by the arrows.

The rotational axis 145 passes through the impingement point 107 to prevent variations in the rate with which the impingement point 107 moves over the internal surface. These variations are caused by a sweeping motion of the central spray axis 109. Rotation about the rotational axis 145 may be accomplished, as shown, by merely rotating the whole torch support around the rotational axis 145. A less desirable alternative, because of the complexity, is rotating the apparatus about another axis and compensating by motion programming such that the net movement is a rotation about the rotational axis 145 which passes through impingement point 107.

The rotating means 151 may be a conventional means used in plasma torch technology, as for example, cam, motor, or hydraulic controlled systems, which are coordinated with the first and second moving means 147, 149. Typically the rotating means 151 includes a shaft 153 with an axis corresponding to the torch rotational axis 145 in suitable stiff bearings 155.

Rotating means 151 and moving means 147, 149 are coordinated in order to maintaining the central spray axis 109 in an optimal position for coating. Coordinating means are conventional, and include interlocking mechanisms, such as gear, cam control, hydraulic, pneumatic, motor, and lever mechanisms, and computer controlled motion programming.

Referring to FIGS. 3, **4*a*, 4*b*, 4*c*, and 4*d* the impingement point is shown at different locations upon the internal surface 103. As illustrated, the optimal position of the torch 105 can be achieved over the entire internal surface 103, i.e. with the distance between the spray nozzle 140 and the impingement point 107 at a constant optimal value, and the central spray axis 109 perpendicular to the internal surface 103**.

Referring to FIG. 5, the outer end 135 of third arm means 131 is connected to the moving means 147, 149 and the rotating means 151 by a connecting means 157. The connecting means 157 is attached to the shaft 153 of the rotating means 151. Since it is desirable to provide a stiff support for the torch 105, the first, second, and third arm means 111, 121, 131, the connecting means 157, and the shaft 153 are preferably fabricated as one unitary structure, i.e. as one piece with no joints between the components. In addition the third arm means 131 preferably is as short as possible and accordingly extends from the second outer end 125 in a direction approximately parallel to the torch rotational axis 145.

Preferably, the shaft 153, the connecting means 157, and the first, second, and third arm means 111, 121, 131 are a unitary structure in the form of a tube with bends at the junctures of the arm means, connecting means, and shaft. The tube is of sufficient diameter such that the gas supply lines, powder supply lines, electrical cables, cooling water hoses, and other lines required for torch operation, can pass inside the tube to the torch. The cross-section of the tube is preferably circular, but may be elliptical, or polygonal, such as square, or hexagonal, or any other suitable shape.

As an example, an apparatus of the invention may be designed to coat objects such as gas turbine engine outer air seals with a specified range of internal surface profiles. The outer seals typically range in size from an 8-inch internal diameter to a 38-in internal diameter, and usually have an axial length up to 6 inches. An arm suitable for coating the internal surface of an outer air seal is constructed from tubing with a $2\frac{1}{2}$ inch outside diameter, and a 0.065 inch wall thickness. The first, second, and third arm means, connecting means and shaft 111, 121, 131, 157, 153 are formed as a unitary structure by bending the tube by 5-inch center line radius bends. The angle $\alpha$ is approximately 30°, and the angle between first and second arm means 111, 121 is approximately 90°. The third arm means 131 extends essentially parallel with the shaft 153, and the angle between the third arm means 131, and the plane formed by the main axes of the first and second arm means 111, 121, is about 120°. The approximate lengths of the straight sections between the radial bends of the first, second, and third arm means 111, 121, 131 are 5, 1, and $2\frac{1}{2}$ inches, respectively. The approximate lengths of the straight sections between the radial bends of the connecting means 157 and the shaft 153 are approximately 11, and 4, inches, respectively. The inside of the tubing houses the appropriate gas, water and electrical services. The stiffness of the unitary structure is such that it has a deflection less than about 1/32 inch. The deflection is measured by mounting the unitary structure by the shaft with the shaft extending horizontally. A 10 pound load is placed at the torch location and the deflection at the torch location resulting from the load is measured.

The apparatus of the invention is preferably used in conjunction with other means to move the object under the torch nozzle, thus presenting new surface to be coated. As illustrated in FIG. 5, preferably an object rotating means 159 is provided to rotate the object 101 about the longitudinal axis **101*a*, as illustrated by the arrows. The object rotating means 159 moves the internal surface 103 radially around the longitudinal axis 101*a* allowing the impingement point 107 to move over the entire internal surface 103. The speed of rotation is coordinated with the moving means and rotational means 147, 149, 151 to provide a constant rate of movement of the impingement point 107 over the internal surface 103. The object rotating means 159** may be of conventional construction, such as a clamping means mounted upon a rotating shaft. Alternately, the object moving means may be an apparatus for compensating for radial variation of the internal surface, such as disclosed for example in U.S. Pat. No. 3,915,114.

In a preferred embodiment of the invention, the first arm means 111 is substantially straight with the mounting angle, the angle of the main axis of the first arm means 111 with the central spray axis 109, of about 135°, as illustrated in FIGS. 1 to 5. For an apparatus of the invention proportioned essentially as in FIG. 1, this allows coating of an internal surface 103 generally having surface angles between about 45° and 135°. The surface angle is defined as the angle between a line defined by intersection of the working plane 143 and the plane perpendicular to the longitudinal axis **101*a* and passing through the impingement point 107, and the line defined by the intersection of the internal surface 103 and working plane 143. Angles less than 90° refer to surfaces facing the open end 102, and angles greater than 90° refer to surfaces facing away from the open end 102. Generally the surface angles which may be coated by an apparatus of the invention, proportioned essentially as shown in FIGS. 1 to 4, cover a range of 90°. The surface angle range may be extended, depending upon the dimensions of the first, second, and third arm means 111, 121, 131, as well as the particular geometry of the object 101 being coated. For example, the second arm means 121 may be shortened or formed in curved shape. However, these measures may decrease the length of objects which can be suitably coated. For an apparatus essentially proportioned as is FIGS. 1 to 4**, mounting angles 105° and 165°, would generally allow coating of surface angles from 60° to 150°, and 30° to 120°, respectively. The mounting angle may also be 90° or 180° to enable coating of a rear face (surface angle of 180°) or a front face (surface angle of 0°), respectively. Thus, by appropriate choice of the mounting angle, it is possible to coat surfaces not surrounded by the enclosed volume, such as end faces, or to coat the bottom and inside surfaces of a cup-shaped tubular object. Depending upon the mounting angle, the lengths of the arm means, and the proportions of the object, it may be possible to coat an internal surface with surfaces angles from 0° to 180°.

Other variations may include curvature of one or more of the arm means, and the connecting means 111, 121, 131, 157. The joinders of the arm means, and the connecting means 111, 121, 131, 157 may also be in the form of smooth curves, to form generally curvilinear shape.

In FIGS. *6a* and *6b* illustrate a conventional prior-art plasma spray apparatus with the plasma torch attached to a straight support arm. As shown, the torch 205 is illustrated in a position for an optimal coating with the central spray axis 209 perpendicular to the internal surface 211 and a constant predetermined distance between the spray exit and the impingement point 207. But, in order to achieve this position the arm 213 has to pass through the object 215 being coated at 221 in FIG. *6a* , and 223 in FIG. *6b*, which is clearly impossible. Accordingly, a straight arm mounted plasma torch is unsuitable for applying an optimal coating to the internal surface of the object 213.

In contrast, in the present invention as illustrated in FIGS. 3, and 4*b*, which show the torch placement for essentially the same impingement points on the object as in FIGS. *6a* and *6b*, an optimal position is possible without interference of the support structure and the object.

While this invention has been described with reference to certain specific embodiments and examples, it will be recognized by those skilled in the art that many variations are possible without departing from the scope and spirit of the invention, and that the invention, as described by the claims, is intended to cover all changes and modifications of the invention which do not depart from the spirit of the invention.

What is claimed is:

1. A plasma spray apparatus adapted for coating an irregular internal surface of a tubular object in which the spray apparatus has a nozzle for directing the coating material on the internal surface of the object and wherein a central spray axis drawn through the center line of said nozzle is adapted to be maintained perpendicular to an impingement point on the surface of the tubular object being coated, which apparatus comprises;

(a) a plasma torch for spraying a plasma coating on the internal surface of the tubular object, the torch having a spray nozzle adapted to provide a spray to an impingement point on the internal surface of the tubular object;

(b) first arm means with an inner end and an outer end, the inner end fixedly attached to the torch, the length of the first arm means being such that the central spray axis drawn through the center line of the nozzle can be disposed perpendicular to the internal surface of the tubular object while the nozzle is maintained a fixed distance from the internal surface of the tubular object without interference with the internal surface of the tubular object as the impingement point moves over the internal surface;

(c) second arm means with an inner end and an outer end, the inner end fixedly attached to the outer end of the first arm means with the outer end adapted to be outside of the enclosed volume of the tubular object as the impingement point moves over the internal surface of the tubular object;

(d) third arm means with an inner end and an outer end, the inner end fixedly attached to the outer end of the second arm means with the outer end adapted such that the central spray axis can be disposed perpendicular to the internal surface of the tubular object while the nozzle is maintained a fixed distance from the internal surface of the tubular object without interference of the third arm means with the tubular object as the impingement point moves over the internal surface, wherein the first arm means, the second arm means, and the third arm means are fabricated as a unitary structure;

(e) moving and rotating means attached to the outer end of the third arm means for moving the first arm means, second arm means, and third arm means to effect movement of the spray nozzle in a direction parallel and in a direction perpendicular to the longitudinal axis of the tubular object, and for rotating the spray nozzle about a rotational axis so that the central spray axis is directed perpendicular to the impingement point on the internal surface of the tubular object; and (f) coordinating means for coordinating the movement and rotation of the spray nozzle as the object is rotated about its longitudinal axis such that the central spray axis is maintained substantially perpendicular to the internal surface, the distance between the spray nozzle and the impingement point is maintained substantially constant, and the rate at which the impingement point moves over the internal surface is maintained substantially constant.

2. The apparatus of claim 1 wherein the first arm means is dimensioned to clear the object when first arm means is nearly perpendicular to the axis of rotation, and when a portion of the internal surface is being coated which is closest to the longitudinal axis.

3. The apparatus of claim 1 wherein the second arm means is substantially straight with its main axis perpendicular to the main axis of the first arm means, wherein the angle, $\alpha$, between the main axis of the second arm means and a plane defined by the main axis of the first arm means and the central spray axis is from 0° to 40°.

4. The apparatus of claim 3 wherein the angle $\alpha$ is about 30°.

5. The apparatus of claim 1 wherein the main axis of the third arm means is oriented essentially parallel to the rotational axis.

6. The apparatus of claim 1 wherein the length of the outer end of the third arm means extends outside of the projected volume.

7. The apparatus of claim 1 wherein the rotating means comprises a shaft with an axis of rotation corresponding to the rotational axis, and the outer end of the third arm means is attached to the moving and rotating means by a connecting means.

8. The apparatus of claim 7 wherein the first arm means, second arm means, third arm means, connecting means and shaft are a unitary structure.

9. The apparatus of claim 8 wherein the unitary structure is formed from a hollow tube.

10. The apparatus of claim 9 wherein gas supply lines, electrical cables, and cooling water hoses pass through the interior of the tube.

11. The apparatus of claim 1 wherein one or more of the group consisting of the first arm means, second arm means, and third arm means is straight.

12. The apparatus of claim 1 wherein one or more from the group consisting of the first arm means, second arm means, and third arm means is curved.

13. The apparatus of claim 1 wherein the angle between the main axis of the first arm means and the central spray axis is between 90° and 180°.

14. The apparatus of claim 1 wherein the angle between the main axis of the first arm means and the central spray axis is between 105° and 165°.

15. The apparatus of claim 1 wherein the angle between the main axis of the first arm means and the central spray axis is 135°.

16. The apparatus of claim 1 wherein the object has an internal surface which is a surface of rotation about the longitudinal axis.

17. The apparatus of claim 1 wherein the object is moved by an object moving means to move the impingement point over the internal surface, the object moving means coordinated with the moving and rotating means to provide a substantially constant rate of movement of the impingement point over the internal surface.

18. The apparatus of claim 17 wherein the object moving means rotates the object about the longitudinal axis.

19. The apparatus of claim 1 wherein the apparatus is capable of coating the internal surface at surface angles between about 0° and about 180°.

20. The apparatus of claim 1 wherein the apparatus is capable of coating the internal surface at surface angles between about 30° and about 150°.

21. The apparatus of claim 1 wherein the apparatus is capable of coating the internal surface at surface angles between about 60° and about 150°.

22. The apparatus of claim 1 wherein the apparatus is capable of coating the internal surface at surface angles between about 30° and about 120°.

23. The apparatus of claim 3 wherein the main axis of the third arm means is oriented essentially parallel to the rotational axis, the rotating means comprises a shaft with an axis of rotation corresponding to the rotational axis, and the outer end of the third arm means is attached to the moving and rotating means by a connecting means.

24. The apparatus of claim 23 wherein the first arm means, second arm means, third arm means, connecting means and shaft are a unitary structure.

25. The apparatus of claim 24 wherein the unitary structure is formed from a hollow tube.

26. The apparatus of claim 25 wherein gas supply lines, electrical cables, and cooling water hoses pass through the interior of the tube.

27. The apparatus of claim 26 wherein the unitary structure of the first arm means, second arm means, third arm means, and connecting means has a deflection of less than 1/32 inch.

* * * * *

UNITED STATES PATENT AND TRADEMARK OFFICE
CERTIFICATE OF CORRECTION

PATENT NO. : 4,866,241

DATED : September 12, 1989

INVENTOR(S) : W. G. Doherty, M. McCoy, D. J. Sharp

It is certified that error appears in the above-identified patent and that said Letters Patent is hereby corrected as shown below:

Column 4, line 60, after "and" insert --move the--.

Column 6, line 29, "134°" should read --130°--.

Column 6, line 40, "101a ," should read --101a,--.

Column 8, line 5, delete the comma after "4".

Column 9, line 20, "6a ," should read --6a,--.

Signed and Sealed this

Fifteenth Day of January, 1991

*Attest:*

HARRY F. MANBECK, JR.

*Attesting Officer* *Commissioner of Patents and Trademarks*